United States Patent [19]
Courtney et al.

[11] Patent Number: 5,937,352
[45] Date of Patent: *Aug. 10, 1999

[54] SATELLITE-BASED CELLULAR TELECOMMUNICATIONS SYSTEM UTILIZING AN EARTH STATION SUBSYSTEM

[75] Inventors: William F. Courtney, Long Beach; Christian H. Wiher, Santa Rosa, both of Calif.

[73] Assignee: TRW Inc., Redondo Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/653,606

[22] Filed: May 13, 1996

[51] Int. Cl.$^6$ ....................................................... H04Q 7/20
[52] U.S. Cl. ........................... 455/435; 455/429; 455/428; 455/12.1
[58] Field of Search ...................................... 455/428, 429, 455/432, 433, 435, 445, 430, 12.1, 13.1

[56] References Cited

U.S. PATENT DOCUMENTS

| | | | |
|---|---|---|---|
| 5,260,987 | 11/1993 | Mauger | 455/445 |
| 5,303,286 | 4/1994 | Wiedeman | 455/428 |
| 5,619,209 | 4/1997 | Horstein et al. | 455/429 |
| 5,664,006 | 9/1997 | Monte et al. | 455/405 |
| 5,710,805 | 1/1998 | Armbruster | 455/435 |

*Primary Examiner*—Reinhard J. Eisenzopf
*Assistant Examiner*—Darnell R. Armstrong
*Attorney, Agent, or Firm*—Michael S. Yatsko

[57] ABSTRACT

The present invention includes a satellite based telecommunications system having an earth station network which enables user terminals to remain registered with a single visitor location register independent of satellite movement so long as the terminal remains within a fixed geographic location area. The preferred embodiment includes multiple earth stations which communicate with user terminals via coverage satellites. Each user terminal is registered with a single visitor location register. As the user passes between location areas, the user terminal re-registers at a new associated visitor location register. Earth stations and mobile-services switching center/visitor location registers (MSC/VLRs) are interconnected along a dedicated earth station network link. Communications data is passed along the earth station network link between MSC/VLRs and earth stations in a compressed and/or encoded format. Each MSC/VLR is interconnected along a terrestrial network link with a gateway and the public switching telephone network. Communications data is passed along the terrestrial network link in a decompressed and/or decoded format. Optionally, MSC/VLRs may be located physically remote from earth stations. When MSC/VLRs and earth stations are provided at a common physical site, a modem switch is provided to selectively interconnect the earth station and MSC/VLR and the earth station network link. Earth stations and MSC/VLRs communicate along the earth station network through wide area network interfaces.

21 Claims, 6 Drawing Sheets

SATELLITE-BASED CELLULAR TELECOMMUNICATIONS SYSTEM UTILIZING AN EARTH STATION SUBSYSTEM

BACKGROUND OF THE INVENTION

In known terrestrial cellular telecommunications systems the resources that enable a terminal (e.g., mobile phone, fixed terminal, etc.) to communicate on the system are fixed with respect to the terrain. Generally the terrain is divided into distinct cells 2 (FIG. 1) which may be grouped into location areas 9. By way of example, the borders of the location areas 9 are set forth in bold. The location areas 9 are grouped into mobile service switching centers (MSC) regions 6. The MSC regions 6 together constitute the service area of a Public Land Mobile Network (PLMN) 8.

Each cell is supported by a unique set of radio resources, including a radio tower. These resources are part of a Base Station Subsystem (BSS). The resources devoted to a single cell are supported by a Base Transceiver Station (BTS). The terrestrial area included in a cell is therefore dictated by the coverage capabilities of its associated radio tower. A location area is a set of cells which are treated as a common pool of radio resources for certain functions such as the paging of a terminal to notify it of an incoming call. That is, all cells in a location area would page the called terminal. By grouping cells into location areas, the system defines a larger terrestrial area than that supported by a single cell. Hence, a terminal is allowed to roam over a larger area and still have the cellular network consider its position as being 'known'.

A location area, in turn, will belong to one and only one MSC region. A MSC region is the geographical area served by a Mobile-services Switching Center (MSC) (for example, MSCs 11 or 21 of FIG. 1) and its associated Visitor Location Register (VLR) (for example VLRs 13 or 19 of FIG. 1). MSCs and VLRs may be paired together. When it is not important to make a functional distinction between an MSC and a VLR, the pair is referred to as an MSC/VLR. The MSC is the point at which a cellular network interfaces its radio resources network into a traditional land-line based network. Also the MSC may interface with the Public Switched Telephone Network (PSTN), in which case it is referred to as a gateway-MSC (GW-MSC) 5.

When a terminal is purchased, it is assigned a mobile-services integrated services digital network (MSISDN) number, i.e., a mobile phone number, from the stock of numbers assigned to the cellular services provider. This number and subscriber service information is entered into a data base called a Home Location Register (HLR) 3. When a terminal is turned on, it searches the airwaves for a broadcast channel which is transmitting location area identification (LAI) information. Each BTS operates such a broadcast channel in its cell. The terminal receives the LAI information and compares it to the LAI stored in its memory. The LAI in the terminal's memory may be programmed by the terminal's vendor if it has just been purchased, or it may be the LAI of the location area of the terminal at the time that it was last turned off or left the services area. If the broadcast and memory-resident LAIs match, then the terminal goes into a standby mode and is ready to originate or terminate calls.

If the two LAIs do not match, then the terminal must re-register, for the network is not aware of the terminal's current location. The terminal registers by signaling (through the BSS) to the MSC/VLR whose region includes the terminal's current location area. For example, in FIG. 1, terminal 1 would register by signaling to MSC/VLR 11/13. The MSC/VLR 11/13 notes the terminal's current location area and determines whether the terminal is already registered with it in a previous location area in the same MSC region 6. If so, then the MSC/VLR 11/13 changes the terminal's location data, the registration ends, and the terminal enters a standby mode. However, if terminal 1 were to move from location area 9 to location area 4, the terminal 1 must re-register with MSC/VLR 21/19. Otherwise, neither MSC/VLR 11/13 nor MSC/VLR 21/19 will be able to access terminal 1 since MSC/VLR 21/19 will lack the necessary terminal identification and location information and since MSC/VLR 11/13 will be too remote to maintain an RF communications link with the terminal 1. To effect re-registration, the MSC/VLR 21/19 informs the terminal's HLR 3 that the MSC/VLR 21/19 is serving the terminal. The HLR 3 notes this information and checks to see whether the terminal 1 was previously registered with another MSC/VLR, such as MSC/VLR 11/13. If a previous registration existed, the HLR deletes this old registration and signals the MSC/VLR 11/13 holding the previous registration information to de-register the terminal.

Figure 1:
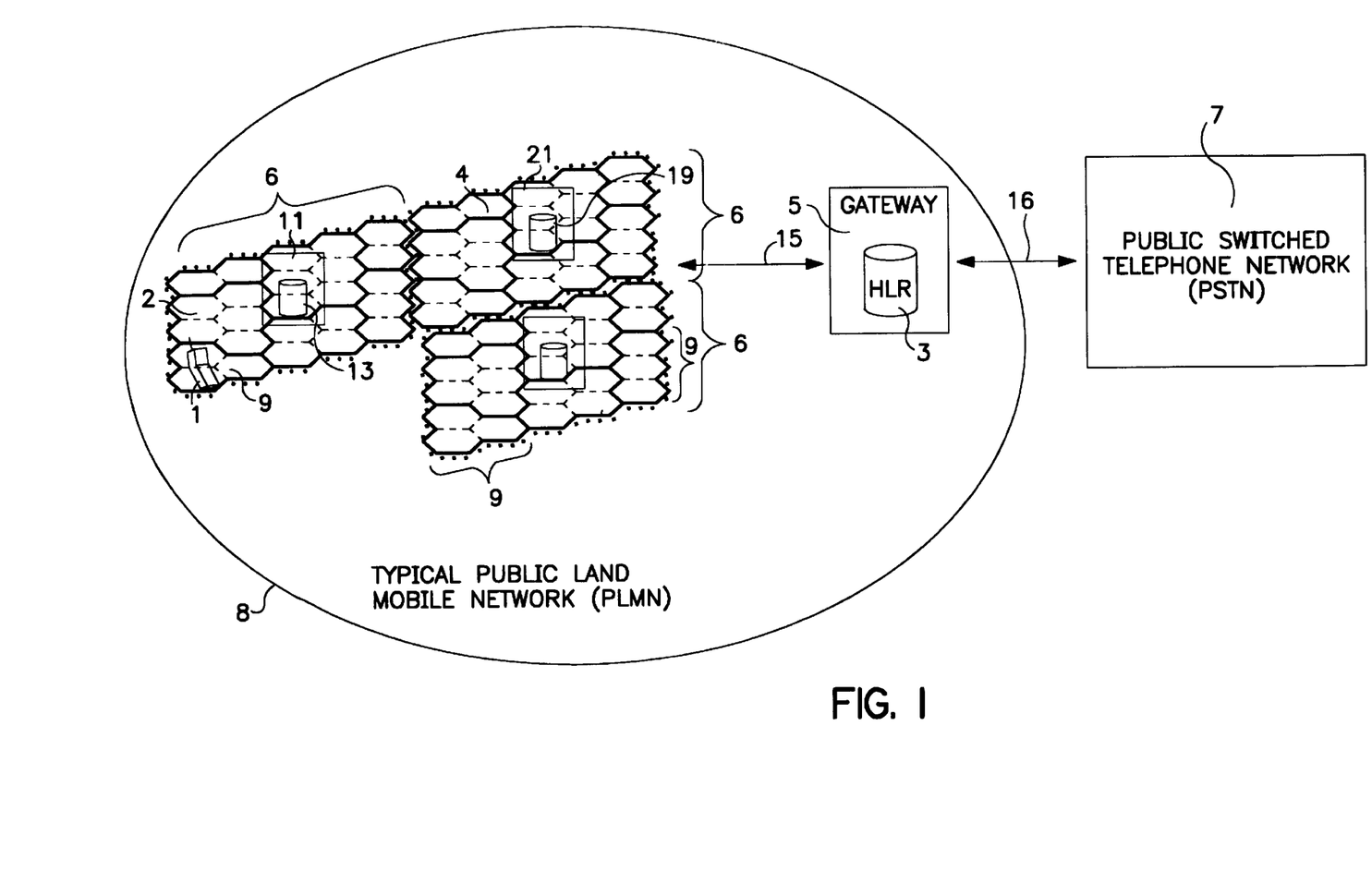
FIG. 1 illustrates a known terrestrial cellular telecommunications system.

The purpose of this exchange of information is to enable the routing of mobile-terminated calls (calls to the terminal) and to be able to identify the terminal when it places mobile-originated calls (calls from the terminal). If such re-registration did not occur, calls placed to terminal 1 would be lost since gateway 5 will route such calls to MSC/VLR 11/13 which represents the last known MSC/VLR registered with the HLR 3 for terminal 1. The use of the VLR and HLR information in PLMNs is described below.

Mobile-terminating calls enter the PLMN of the terminal subscriber at a GW-MSC. The method for routing the call to the GW-MSC may be any standard telephony practice based on the MSISDN number of the called terminal. The GW-MSC examines the called terminal's MSISDN number and determines which HLR serves the subscriber. Based on this information, the GW-MSC signals that HLR and requests information on how to route the call to the terminal. The HLR consults its data base and finds the MSC/VLR serving the terminal. This is why the MSC/VLR had to inform the HLR that the MSC/VLR was serving the terminal. The HLR informs the VLR that a call is pending for the terminal with the called MSISDN number, and the HLR requests a telephone number at the MSC to which the call can be routed. The VLR delivers that telephone number to the HLR, and the HLR passes it back to the GW-MSC. The GW-MSC routes the call to the MSC. When the call reaches the MSC, the MSC queries its associated VLR to determine the identity of the called terminal and the location area in which the terminal should be paged. This is why the terminal must inform the MSC/VLR whenever its location area changes. The VLR responds to the MSC with the terminal's identity and LAI. The MSC requests the BSS to page the terminal in the terminal's location area. The BSS sends this paging request on to the BTSs covering the cells in the terminal's location area, and these BTSs broadcast the page. The terminal in standby hears the page and responds. After a brief exchange of signals, the end-to-end call connection is complete.

Mobile-originating calls do not require so elaborate a routing mechanism. However, as a security measure against fraudulent use of the PLMN and to preserve the confidentiality of the mobile subscriber, the VLR can have information known only to it and the terminal. This information is constructed as part of the registration signaling between the terminal and the MSC/VLR and is stored at the terminal and in the VLR. When a mobile-originated call is initiated, this information must be present in the VLR so that fraud-prevention and confidentiality mechanisms can be implemented.

Note that terminal registration (other than the initial registration of a brand-new terminal) is caused by terminal movement from one location area to another. This movement is not coordinated among the terminals, and thus occurs randomly and at a relatively low rate.

Note also that the collecting of cells into location areas is an important trade-off in the detailed design of a cellular system. Large location areas reduce the number of terminal registrations because terminals have to travel farther before they leave their current location area. Since registration consumes radio signaling resources, lowering the number of registrations tends to increase the capacity of a PLMN with a given amount of radio resources. On the other hand, terminals must be paged across their entire location area since a terminal is free to move around inside its location area without informing the network of its movement (via registration). As a location area is made larger, the terminals within it must be paged in more cells. Since paging also consumes radio signaling resources, decreasing the size of location areas tends to increase the capacity of a PLMN with a given amount of radio resources. Thus, it is desirable to find an acceptable size for location areas so that a minimum of radio signaling resources are employed for the joint duties of registration and paging.

The foregoing operation is manageable in conventional terrestrial systems since re-registration is dictated by movement of individual terminals between location areas. Hence, terminals re-register individually. The terrestrial system never requires simultaneous mass re-registration of a large number of terminals.

However, satellite based systems experience difficulties not addressed in terrestrial systems. Proposed satellite-based telecommunications systems include terminals, satellites, earth stations, MSCs/VLRs, GW-MSCs, and a terrestrial network interconnecting the earth stations, MSCs/VLRs, and GW-MSCs. The satellites may perform some functions related to the functionality of the BTSs and the earth station may perform some functions related to the functionality of the BSS.

Satellite-based telecommunications systems have been proposed which employ satellites orbiting the earth at other than geo-stationary altitudes. The satellites in these systems move with respect to the earth's surface, and so their fields of coverage on the earth's surface continuously change. In the analogy with PLMNs, it is as if the radio towers (the BTSs) were in continuous motion. The cells in cellular systems are defined by the reach of the network radio resources, and thus the cells in the satellite-based systems are in continuous motion. Since the cells are in continuous motion, so too are the location areas. Because, as shown above, a terminal must re-register whenever its location area changes, either the terminals would be continually registering or location areas would have to be very large.

Further, registrations caused by cell motion can have catastrophic consequences on the operation of the satellite-based systems. The root of the potential catastrophe is that the motion of the satellites affects many terminals in the same way simultaneously, or nearly simultaneously. When a satellite no longer covers a terminal, it is also not covering any other nearby terminals. The ground speed of the field of coverage of satellites in proposed satellite-based telecommunications systems is several kilometers per second. Thus, a great number of terminals may become uncovered by a particular satellite in a matter of seconds. If all of these terminals were to register to the radio resources in another satellite, that other satellite would be inundated with registration signaling. Such a near-simultaneous registration of terminals in a given geographic area is termed a "mass registration event." At the very least, the satellite's traffic capacity would fall by the amount of signaling required for the registrations. More likely, all available signaling channels would be choked with registration signaling, and no new calls either to or from terminals in the area could be initiated during registration.

Figure 2:
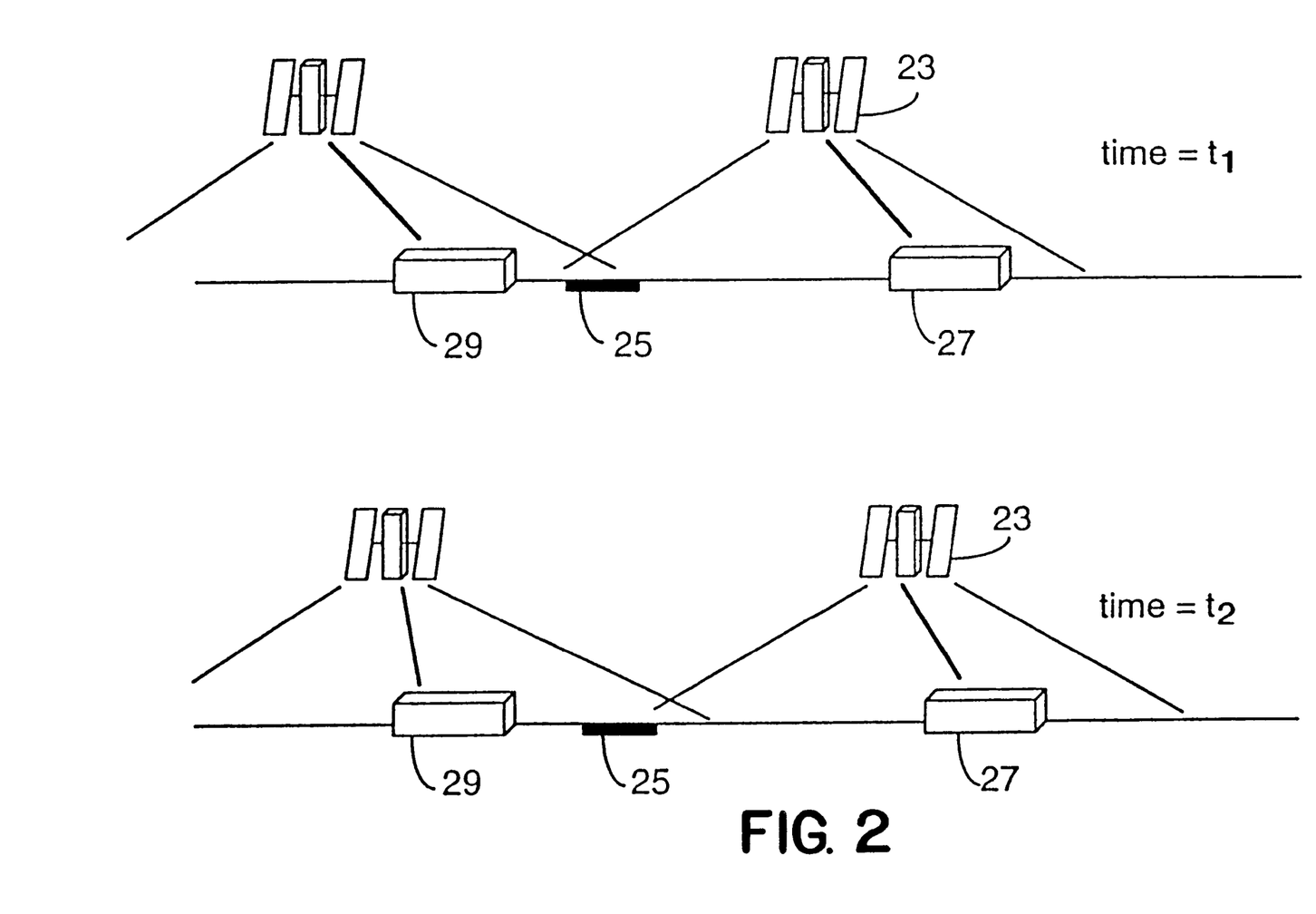
FIG. 2 illustrates an example of satellite-to-terminal connectivity.

To further illustrate the concept of mass re-registration, reference is made to FIG. 2 which illustrates how changing satellite-to-terminal connectivity can trigger re-registrations between times $t_1$ and $t_2$. At time $t_1$ satellite 23 covers terminals in area 25. At time $t_2$ satellite 23 moves beyond area 25. According to the aforementioned process, when satellite 23 moves, terminals in area 25 registered through satellite 23 at earth station 27 must re-register with earth station 29 or be lost to the system.

Moreover, a mass registration event may occur even while a collection of terminals in a region remains under the coverage of a single satellite. In order for a satellite-based telecommunications system to function, the satellites must remain in contact not only with the terminals but also with the network. The contact points for the satellites are earth stations. From time to time as it orbits, each satellite breaks contact with one earth station and establishes contact with others. Conventional satellite-based telecommunications systems include MSC/VLRs as integral parts of each earth station. A satellite must be in contact with an earth station in order to be in contact with the MSC/VLRs in that earth station. Thus, when a leaving satellite breaks contact with the earth station it also breaks contact with the uncovered earth station's MSC/VLR. Hence, when the system routes terminal-terminated calls covered by the leaving satellite to an MSC/VLR no longer covered by the satellite, the uncovered MSC/VLR can no longer put calling parties in contact with the termination terminals. All of the terminals registered at the uncovered MSC/VLR and in standby under the satellite have effectively lost contact with the network. In order to regain contact, they must all register with some other MSC/VLR which is still in contact with the covering satellite(s). This mass re-registration event would again choke the satellites' signaling resources and either greatly diminish or altogether eliminate the capacity for new traffic.

Figure 3:
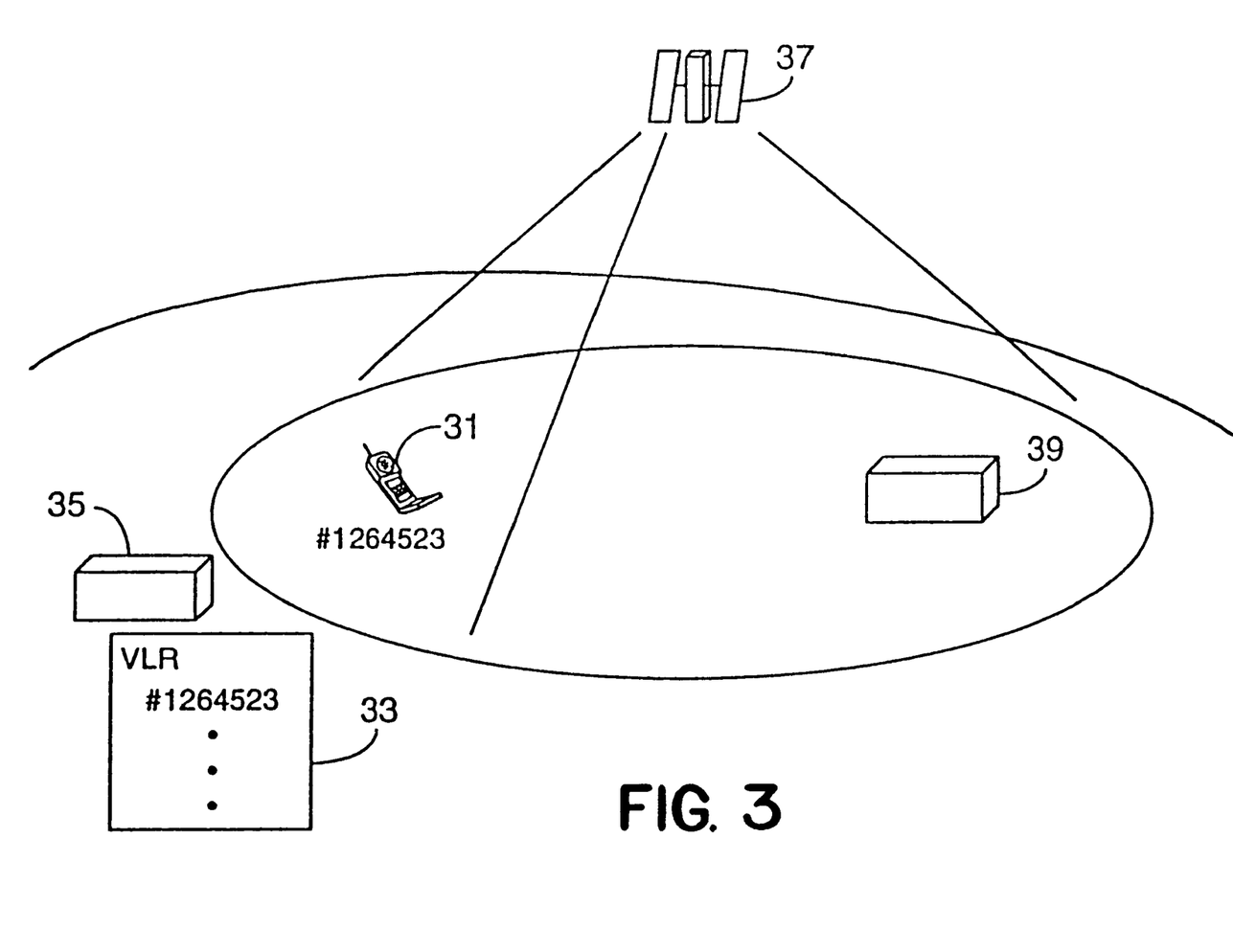
FIG. 3 illustrates an example of satellite-to-earth station connectivity.

FIG. 3 illustrates how satellite-to-earth station connectivity can trigger re-registrations. In FIG. 3, terminal 31 is registered in MSC/VLR 33 of earth station 35. As satellite 37, the only satellite covering terminal 31, moves overhead, it breaks contact with earth station 35. At that point, terminal 31, and all similarly registered neighbors, must re-register with earth station 39, or again, be lost to the system.

It is not practical to enlarge location areas in satellite-based telecommunications systems so that registration is not caused by satellite motions. Several proposed systems have low- and medium-earth orbit satellites whose fields of coverage move across the entire earth in less than a day. Enlarging location areas to a size to include all of the earth or very large portions of the earth would place an impractical paging burden on the radio resources of the satellites.

Thus, there is a need for a satellite based cellular telecommunications system that permits any location area size while limiting the number of re-registrations to only those necessitated by the movement of the terminals from one location area to another (no re-registrations caused by satellite motion). Further, the system should be inter-operable with current commercially-available MSCs, VLRs, MSC/VLRs, and GW-MSCs, so that its development cost permits commercially feasible implementation.

OBJECTS OF THE INVENTION

An object of the present invention is to provide an apparatus and method which permit terminals that have lost a direct satellite link to their assigned MSC/VLR to communicate with their assigned MSC/VLR through a remote earth station without re-registering.

A further object of the present invention is to provide a system that dissociates an MSC/VLR from a local earth station and the earth station's limited and changing location area coverage and instead associates a MSC/VLR with a geographically fixed zone of coverage for one or more geographically fixed location areas that may be serviced by multiple earth stations.

Still a further object of the present invention is to provide a MSC/VLR with a direct communication link to any earth station that may at any time provide coverage to terminals registered to that MSC/VLR that are within that MSC/VLR's zone of coverage.

Still a further object of the invention is to provide a satellite system that enables efficient tracking of terminals in order to prevent having terminals lost to the system.

SUMMARY OF THE INVENTION

The present invention includes a satellite based telecommunications system having an earth station network which enables user terminals to remain registered with a single visitor location register independent of satellite movement so long as the terminal remains within a fixed geographic location area. The preferred embodiment includes multiple earth stations which communicate with user terminals via coverage satellites. Each user terminal is registered with a single MSC/VLR. As the user passes between location areas, the user terminal re-registers at a new associated MSC/VLR. Earth stations and MSC/VLRs are interconnected along a dedicated earth station network link. Communications data is passed along the earth station network link between MSC/VLRs and earth stations in a compressed and/or encoded format. Each MSC/VLR is interconnected along a terrestrial network link with a gateway and the public switching telephone network. Communications data pass along the terrestrial network link in a decompressed and/or decoded format. Optionally, MSC/VLRs may be located physically remote from earth stations. When MSC/VLRs and earth stations are provided at a common physical site, a modem switch is provided to interconnect the earth station and MSC/VLR and the earth station network link. Earth stations and MSC/VLRs communicate along the earth station network through wide area network interfaces.

DETAILED DESCRIPTION OF THE INVENTION

Figure 4:
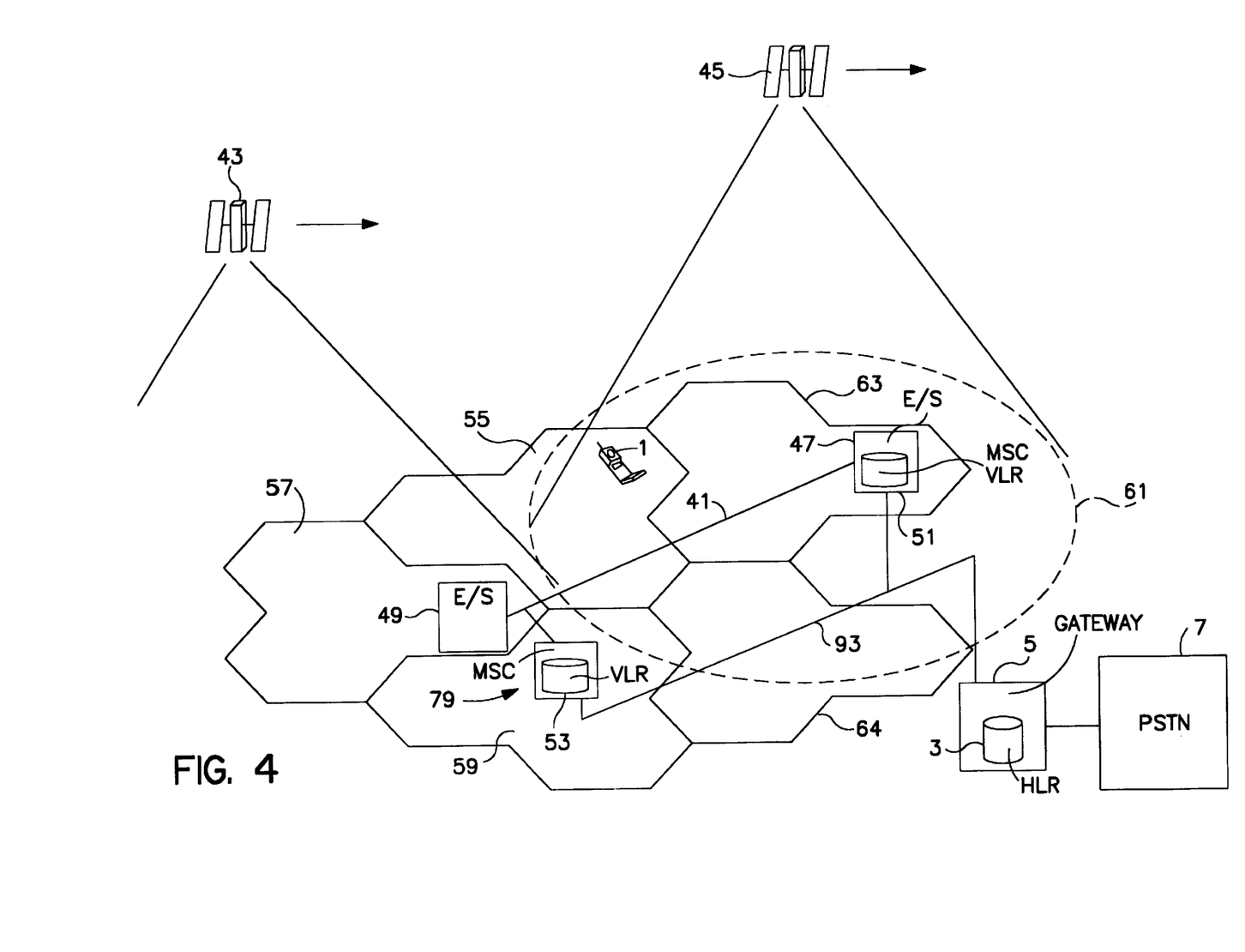
FIG. 4 illustrates one embodiment of the satellite-based cellular telecommunications system built in accordance with the present invention.

FIG. 4 illustrates a satellite based telecommunications system according to a preferred embodiment of the present invention. The system includes multiple earth stations 47 and 49 which communicate with user terminals 1 through communications channels supported by, and routed through, satellites 45 and 43. The earth stations 47 and 49 establish and maintain communications links with the user terminals. By way of example, the earth stations may be implemented as explained in a co-pending application entitled "Power Control Method and Apparatus For Satellite Based Telecommunications System" (Docket No. 34-0009), filed on Apr. 30, 1996 and assigned to the assignee of the present application. The above referenced co-pending application is expressly incorporated in its entirety by reference.

The system of FIG. 4 further includes Mobile-services Switching Centers/Visitor Location Registers (MSC/VLRs) 51 and 53. As explained below, each MSC/VLR operates independently of the earth stations and thus may be housed remote therefrom. To emphasize this structural independence, as shown in FIG. 4, MSC/VLR 51 is illustrated as being located at an earth station 47, while MSC/VLR 53 is illustrated as being located physically remote from the earth stations 47 and 49. The MSC/VLRs 51 and 53 maintain terminal identification information and terminal location information for terminals within location areas assigned to each MSC/VLR. By way of example, MSC/VLR 53 may be assigned to a zone of coverage which includes location areas 55, 57 and 59. Similarly, MSC/VLR 51 may be assigned to the zone of coverage including location areas 63 and 64. Thus, user terminals within location areas 55, 57 and 59 are registered with MSC/VLR 53. User terminals within location areas 63 and 64 are registered with MSC/VLR 51. As shown in FIG. 4, although terminal 1 is registered with MSC/VLR 53, the terminal is located within the coverage area 61 of satellite 45. Thus, terminal 1 maintains a communications link with earth station 47 through satellite 45. As explained below, the terminal 1 remains registered with MSC/VLR 53 without re-registering with MSC/VLR 51.

The system of FIG. 4 further includes an earth station network link (ENL) 41 which provides a communications path, such as a wide area network, between earth station 47, earth station 49, MSC/VLR 51 and MSC/VLR 53. A separate terrestrial network link (TNL) 93 is provided between the MSC/VLRs 51 and 53 and the gateway 5. As explained below, the TNL 93 carries data between the user terminal 1 and the PSTN 7 through the assigned MSC/VLR (53 in the example of FIG. 4) and gateway 5.

Figure 6:
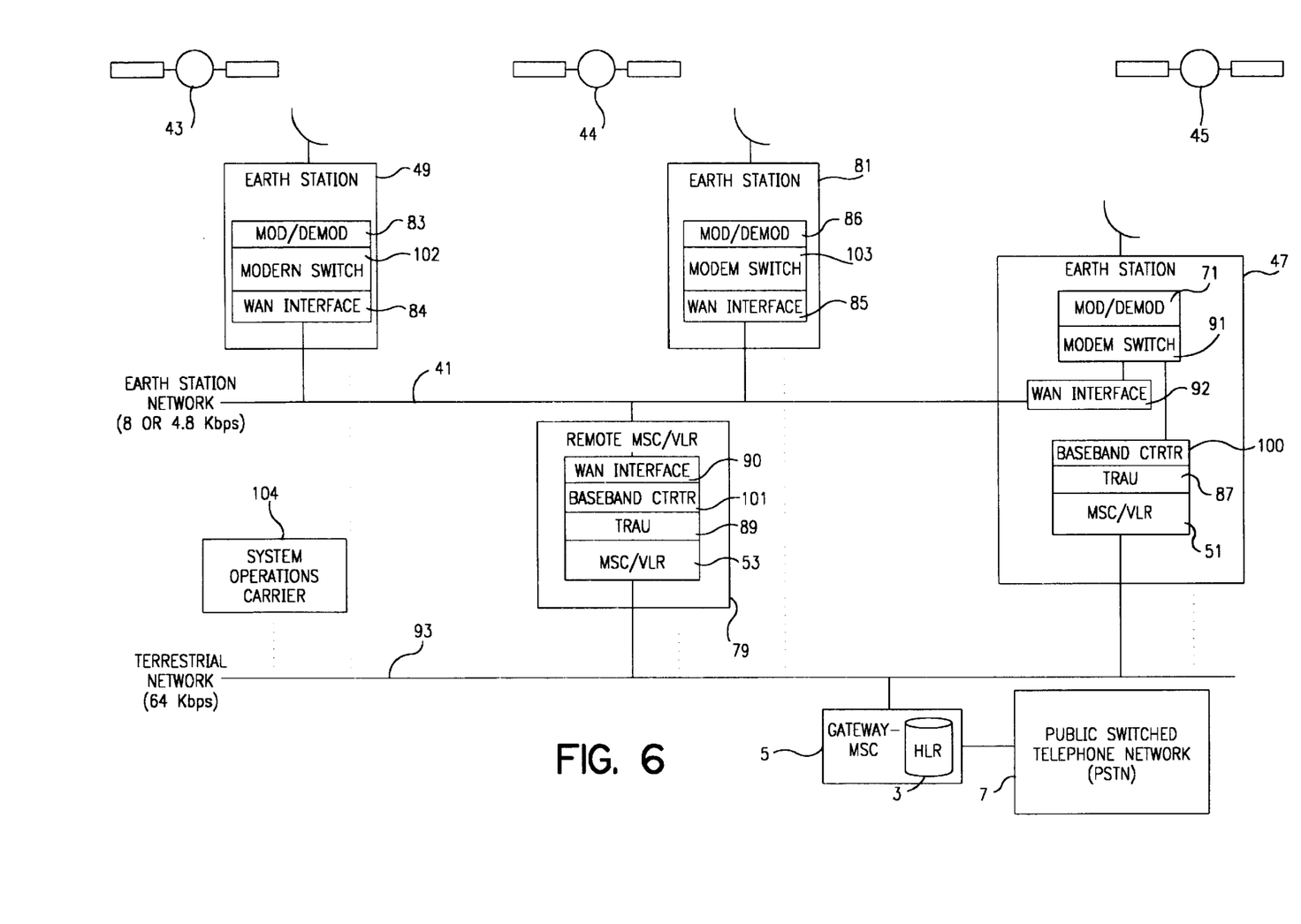
FIG. 6 is a diagrammatic illustration of alternative embodiments of the satellite-based cellular telecommunications system built in accordance with the present invention.

FIG. 6 illustrates the system of FIG. 4 in more detail. The earth station 47 and the MSC/VLR 51 may be located proximate one another at the same equipment site. Alternatively, the MSC/VLR 53 may be located at a separate equipment site 79 remote from any earth station. Likewise, earth stations 49 and 81 may be located physically remote from any MSC/VLR. The earth stations 47, 49 and 81 and the MSC/VLRs 51 and 53 are connected along the ENL 41. The ENL 41 may carry compressed and/or encoded communications and command data between earth stations and MSC/VLRs in a multiplexed manner. The ENL 41 may be configured to include any desired number of channels and operate at any desired transmission rate. The TNL may also support any desired transmission rate. The TNL 93 interfaces with the PSTN 7 through a gateway 5. Hence, it may be desirable to configure the TNL 93 to transmit communications data according to a conventional standard, such as at 64 Kbps. Optionally, the TNL 93 may transmit communications data in a compressed and encoded format to and from the gateway 5.

With continued reference to FIG. 6, transcoder rate adapter units (TRAUs) 87 and 89 are provided at MSC/VLR 51 and 53, respectively. The TRAU 89 interconnects with a Baseband Controller (BC) 101 and performs compression/encoding upon communications data and passes it to the BC 101. The TRAU 87 decompresses and/or decodes communications data received from the BC 101. The TRAU 87 interconnects with BC 100 and performs compression and/or encoding upon communications data and passes it to the BC 100. The TRAU 87 decompresses and/or decodes communications data received from BC 100.

BC 100 controls the configuration of the modem switch 91 and selects circuits (e.g., channels) in the modulators and demodulators 71, 83 and 85 for use in communicating with terminals. Optionally, the circuits or channels in the in mod/demods 71, 83, and 86 may be assigned by a system operations center 104. Once assigned, the circuits or channels are available for use by BCs 100 and 101 and thereby for use by MSC/VLRs 51 and 53, respectively. Alternatively, resource managers proximate to each of earth stations 47, 49, and 81 may manage circuit assignment on a call-by-call basis as demanded by BCs 100 and 101. To simplify further discussion, it is assumed that the circuit assignments are managed by resource managers proximate to each earth station.

Modem switch 91 interconnects with a WAN interface 92 and with a modulator/demodulator 71 within the earth station 47. The modulator/demodulator 71 modulates communications data into an RF signal which is transmitted by the earth station 47 to the subset of satellites 43, 44, and 45 which are in contact with earth station 47. In addition, the modulator/demodulator 71 receives and demodulates RF signals from the same subset of satellites 43, 44, and 45 to provide communications data which is supplied to the modem switch 91.

Earth stations 49 and 81 also include WAN interfaces 84 and 85 which provide interfaces between the earth stations 49 and 81 and the ENL 41. The WAN interfaces 84, 85, 90 and 92 may communicate based on conventional wide area network standards and may utilize conventional protocols to transmit communications and command data between the earth stations and MSC/VLRs. The earth stations 49 and 81 also include modem switches 102 and 103, respectively, which connect modulator/demodulator units 83 and 86 to ports in the WAN interfaces 84 and 85, respectively. The modulator/demodulator units 83 and 86 modulate communications data received from the corresponding modem switches 102 and 103, respectively. The modulator/demodulator units 83 and 86 also demodulate incoming communications data received from the subset of satellites 43, 44, and 45 which are in contact with the corresponding earth stations.

The modem switch 91 operates to selectively connect the mod/demod 71 to one of the ENL 41 and the BC 100. The modem switch 91 also selectively connects the BC 100 to the ENL 41 or the mod/demod 71 at earth station 47 (as explained below in more detail). The modem switch 91 is controlled by the resource manager in earth station 47 to direct communications data received from a user terminal through the BC and TRAU to the MSC/VLR at which the terminal is registered. Hence, when an earth station 47 receives an incoming call from a user terminal registered at MSC/VLR 51, the modem switch 91 interconnects the mod/demod 71 and the MSC/VLR 51 through BC 100 and TRAU 87. Alternatively, if the earth station 47 receives an incoming call from a user terminal registered at MSC/VLR 53, the modem switch 91 interconnects the mod/demod 71 with the WAN interface 92. The WAN interface 92 passes the communications data within an assigned channel to the WAN interface 90 which, in turn, relays the communications data through BC 101 and TRAU 89 to the MSC/VLR 53.

When utilizing a compressed and/or encoded format, the communications data passes from earth station 47 to MSC/VLR 53 in a compressed/encoded format along the ENL 41. The TRAU 89 decompresses and decodes the communications data received from the WAN interface 90 through BC 101 and the MSC/VLR 53 in turn places the decompressed/decoded communications data upon the TNL 93 which ultimately carries the communications data to the destination caller. Similarly, incoming calls from the PSTN 7 to a user terminal are passed along the TNL 93 in a decompressed/decoded format to the MSC/VLR at which the destination user terminal is registered. Incoming calls through the MSC/VLR 53 are compressed and/or encoded in the TRAU 89 and passed through BC 101 to the WAN interface 90. The resource manager in earth station 79 instructs the WAN interface 90 to pass the compressed/coded communications data to an appropriate earth station associated with the location area containing the user terminal.

Next, an example is provided in connection with FIGS. 4 and 6. With reference to FIG. 4, a call directed to terminal 1 from the PSTN 7 may enter the network through gateway 5. The gateway accesses the HLR 3 to determine at which MSC/VLR the terminal 1 is registered. As shown in FIG. 4, terminal 1 is within location area 55 and thus registered at MSC/VLR 53. The HLR 3 passes this information to the gateway 5 which directs the communications data along the TNL 93 to the remote MSC/VLR equipment site 79 housing MSC/VLR 53. The TRAU 89 compresses and/or encodes the communications data. To establish a communications link with the user terminal, the MSC/VLR 53 and BC 101 may pass command data between WAN interfaces 90 and 92 (reference FIG. 6) to inform the earth station 47 of the last known location area of the terminal 1 (e.g., location area 55).

The resource manager in earth station 47 utilizes internal geographic mapping information to determine how to access terminal 1, such as the satellites and spot beams covering location area 55. The geographic mapping information may be updated continuously to include information regarding the most appropriate satellites, spot beams, and subband to provide coverage for the specific geographic location identified by the MSC/VLR 53. The mapping information may be based upon satellite movement, satellite coverage, satellite activity to earth stations, earth station sharing plans, system traffic management plans and load balancing information. Once the appropriate geographic mapping information is determined, the mod/demod 71 in earth station 47 transmits a page signal to the user terminal 1 along one or more paging channels. By way of example, the mapping and paging procedure may be carried out in accordance with the system disclosed in a co-pending application entitled "User Paging for Mobile Satellite Communications" filed on Jan.

14, 1994, Ser. No. 08/181,932, which is assigned to the assignee of the present application and expressly incorporated herein in its entirety by reference.

By way of example, when the satellite 45 and terminal 1 are positioned as shown in FIG. 4, earth station 47 constitutes the only earth station within the field of view of satellite 45. Hence, earth station 47 may establish and maintain a communications link with terminal 1 through satellite 45. Therefore, MSC/VLR 53 instructs earth station 47 to transmit a paging signal to location area 55 directed to terminal 1. The command to initiate a page is passed from MSC/VLR 53 through WAN interfaces 90 and 92 along an assigned channel within the ENL 41. The paging command is routed through the modem switch 91 to the mod/demod 71 which transmits a page. When the paging signal is acknowledged by terminal 1, the acknowledgement is passed back between mod/demod 71 and MSC/VLR 53 through modem switch 91, WAN interface 92, ENL 41, WAN interface 90, BC 101 and TRAU 89. Thereafter, once a call is established, the TRAU 89 passes compressed/encoded communications data through BC 101, WAN interfaces 90 and 92, modem switch 91 and mod/demod 71 to the user terminal 1.

Next, an example is provided whereby the terminal 1 initiates a call to a caller within the PSTN 7. To initiate a call, the terminal 1 transmits a call request, along with identification information designating the MSC/VLR at which the terminal is registered. With reference to FIG. 4, terminal 1 passes identification information for MSC/VLR 53 within the call request such as MSC/VLR I.D., location area I.D. and the like. As shown in FIG. 6, the earth station 47 instructs the modem switch 91 to connect with the WAN interface 92. Thereafter, the call request information is relayed between WAN interfaces 92 and 90 to the MSC/VLR 53 identified in the call request. Optionally, the MSC/VLR 53 may return instructional information to the earth station 47 which may be needed to establish a communications link with user terminal 1. Once the communications link is established between terminal 1 and earth station 47, communications data is relayed between WAN interfaces 92 and 90 along the ENL 41 in a compressed and encoded format. The communications data is decompressed and decoded at the TRAU 89 and passed via the MSC/VLR 53 onto the TNL 93 and to the PSTN 7.

Figure 5:
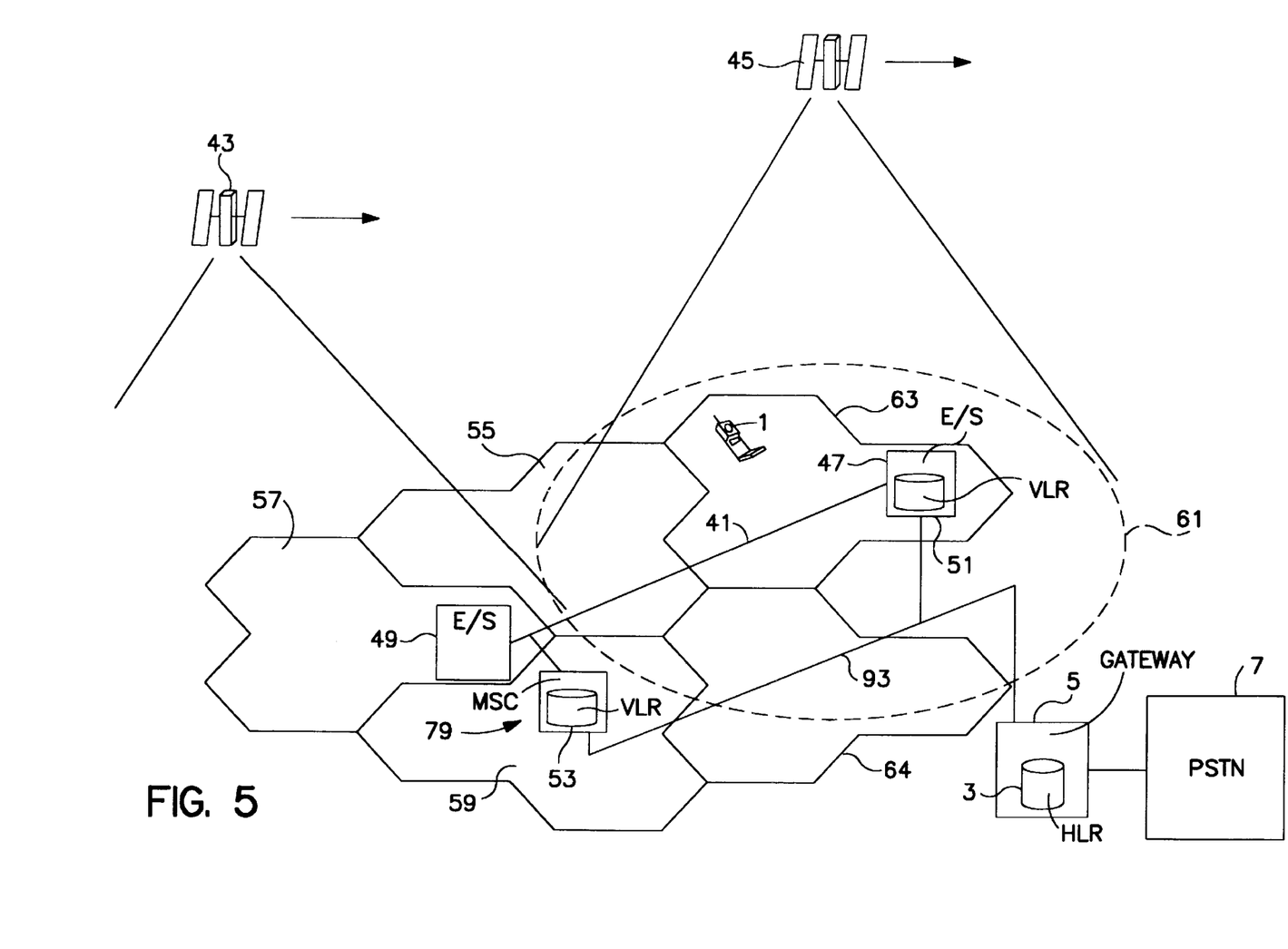
FIG. 5 illustrates one embodiment of the satellite-based cellular telecommunications system built in accordance with the present invention.

Next, an example is provided in connection with FIG. 5 in which terminal 1 moves from location area 55 and enters location area 63. Location area 63 is assigned to MSC/VLR 51 and thus the terminal 1 is re-registered with MSC/VLR 51. To effect re-registration, the MSC/VLR 51 may record the new geographic location of terminal 1, along with any necessary terminal identification information. In addition, the HLR 3 is updated to indicate that terminal 1 is now registered with MSC/VLR 51. The HLR 3 instructs MSC/VLR 53 to de-register the terminal. Thus, when calls are directed to the terminal 1 from the PSTN, the gateway 5 checks the MSISDN number of the terminal 1 and determines from the HLR 3 that the terminal is now registered with MSC/VLR 51. Consequently, the gateway 5 routes the call to MSC/VLR 51 along the TNL 93. The call is then compressed and encoded by TRAU 87 and passed to BC 100. The resources manager in earth station 47 instructs the modem switch 91 to interconnect the communication with the mod/demod 71 directly, not with the ENL 41, since the stored terminal information indicates that earth station 47 and satellite 45 must be used to afford a communications link with terminal 1. The communications data is then passed from the BC 100 to the modulator 71 which modulates the communications data into an RF signal which is transmitted by the earth station 47 through satellite 45 to the user terminal 1. Thus, a communications link is maintained without using the ENL 41.

As to calls initiated by the user terminal 1, the earth station 47 receives the call request from terminal 1. The earth station 47 obtains, from the call, the MSC/VLR identification information designating the MSC/VLR at which terminal 1 is registered. In the example of FIG. 5, terminal 1 is registered with MSC/VLR 51. Thus, the resources manager in earth station 47 controls modem switch 91 to interconnect the demodulator 71 with the BC 100. Outgoing communications data is then passed from the demodulator 71 to the BC 100. The data is in turn decompressed and decoded by TRAU 87 and routed by the MSC/VLR 51 onto the TNL 93.

According to the foregoing process, the preferred embodiment of the present invention enables user terminals to remain registered with a single MSC/VLR until the user terminal leaves a fixed geographic location area assignment to the MSC/VLR. The preferred embodiment enables re-registration to be carried independent of satellite movement and independent of earth station positioning.

Optionally, the ENL 41 may support any desired data transmission rate, such as those used in standard terrestrial ISDN networks (e.g., 64 Kbps) and the like. Optionally, the ENL 41 may be configured to carry data in a multiplexed manner, such as time division multiplexed, in order to afford multiple data channels along a single network. Optionally, the ENL 41 may support a total transmission rate of 64 Kbps, and be configured to support 8 channels, with each channel transmitting at 8 Kbps.

While particular elements, embodiments and applications of the present invention have been shown and described, it will be understood, of course, that the invention is not limited thereto since modifications may be made by those skilled in the art, particularly in light of the foregoing teachings. It is, therefore, contemplated by the appended claims to cover such modifications as incorporate those features which come within the spirit and scope of the invention.

We claim:

1. A subsystem in a satellite based telecommunications system of the type having at least one satellite which supports communications between user terminals and earth stations, said subsystem comprising:

a first earth station for establishing a communications link through a satellite with a user terminal when said user terminal and said earth station are both covered by a satellite generated coverage area that moves with movement of said satellite;

a first MSC/VLR having a mobile services switching center (MSC) and a visitor locator register (VLR), said first MSC/VLR registering, in each instance independently of said satellite generated coverage area movement, terminal information for terminals located in a first geographically fixed location area assigned to said MSC/VLR;

an earth station network, interconnecting said first earth station and first MSC/VLR, for carrying communications data therebetween; and a terrestrial network, connected to said first MSC/VLR, adapted to carry communications data to and from a public telephone system.

2. The subsystem of claim 1, wherein said terminals are registered in only one visitor location register.

3. The subsystem of claim 1, wherein said first MSC/VLR and first earth station are physically located at different equipment sites remote from one another.

4. The subsystem of claim 1, wherein a portion of said first geographically fixed location area assigned to said first MSC/VLR is outside said satellite generated coverage area.

5. The subsystem of claim 1, wherein said earth station network carries said communications data in at least one of a compressed and encoded format and wherein said terrestrial network carries said communications data in at least one of a decompressed and decoded format.

6. The subsystem of claim 1, further comprising a second MSC/VLR and a second earth station, said second MSC/VLR registering, independently of said satellite generated coverage area movement, additional terminal information for additional terminals located in a second geographically fixed location area assigned to said second MSC/VLR, said second MSC/VLR and second earth station being located at a single common equipment site; and a modem switch for interconnecting said second MSC/VLR and second earth station to pass communications data therebetween independent of said earth station network.

7. The subsystem of claim 1, further comprising wide area network interfaces for interconnecting said first earth station and first MSC/VLR with said earth station network.

8. The subsystem of claim 1, further comprising a second earth station and a second MSC/VLR connected to said earth station network, said first and second MSC/VLRs being associated with unique first and second geographically fixed location areas, said second MSC/VLR registering, independently of said satellite generated coverage area movement, additional terminal information for additional terminals located in the second geographically fixed location area, both of said first and second earth stations being located in said first geographically fixed location area wherein one of said first and second earth stations passes communications data from a first terminal in said first geographically fixed location area to said first MSC/VLR and communications data from a second user terminal in said second geographically fixed location area to said second MSC/VLR.

9. The subsystem of claim 1, wherein said first MSC/VLR pages said first terminal through a paging broadcast conveyed through said earth station network to said first earth station which provides coverage for said first geographically fixed location area containing said first terminal.

10. The subsystem according to claim 1, wherein said user terminal initiates a call by transmitting a channel request containing an identifier, and wherein said first earth station relays said channel request along said earth station network to said first MSC/VLR at which said user terminal is registered based on said identifier.

11. The subsystem according to claim 1, wherein said MSC/VLR further includes transcoders for encoding and decoding calls passed between said earth station network and said terrestrial network.

12. The subsystem according to claim 1, wherein said first earth station transmits calls along said earth station network to said first MSC/VLR in an encoded format, and wherein said first MSC/VLR converts an incoming encoded call to a decoded call and transmits said decoded call along said terrestrial network.

13. A satellite based telecommunications system including earth stations and terminals, said system comprising:

a plurality of satellites;

a plurality of satellite generated coverage areas that move with movement of said plurality of satellites;

a plurality of earth stations; at least first and second visitor location registers having unique associated first and second geographically fixed location areas, said first and second visitor location registers registering, in each instance independently of said satellite generated coverage area movement, terminal information for at least first and second terminals therewith, respectively;

a gateway having a home location register, said home location register storing routing information identifying a visitor location register at which each terminal is registered, said gateway directing communications data between a public telephone systems and one of said first and second visitor location registers based on said routing information stored in said home location register; and a direct communications link between said visitor location registers and said earth stations, wherein said first visitor location register directs communications data to and from any of said earth stations through said direct communications link.

14. A method for routing calls in a satellite based cellular telecommunications system of the type having at least one satellite supporting communicating between user terminals and visitor location registers assigned to unique geographically fixed location areas, each of the visitor location registers containing terminal information for user terminals registered therewith, the method comprising the steps of:

registering terminal identity and location information for a terminal located in a first geographically fixed location area with a first visitor location register;

storing said terminal identity and location information from said first visitor location register in a home location register;

receiving a call from a public switch telephone network directed to said terminal;

routing the call to a visitor location register at which the terminal is registered based on a terminal identifier in the call and terminal identity and location information stored in the home location register; and rerouting the call from the first visitor location register to an earth station capable of establishing a communications link with the user terminal through a satellite generated coverage area that moves with movement of said satellite, said call being rerouted along an earth station network;

and wherein said registering step comprises registering information for said terminals in each instance independently of said satellite generated coverage area movement.

15. The method of claim 14, further comprising the step of compressing the incoming call prior to transmission from the visitor location register to the earth station along the earth station network.

16. The method according to claim 14, further comprising the step of locating the visitor location register and the earth station remote from one another.

17. A method according to claim 14, further comprising the step of utilizing modem switches to interconnect at least one earth station with a first visitor location register located proximate and at the same equipment site as the earth station, said modem switch connecting the earth station with a second visitor location register assigned to a second geographically fixed location area, said second visitor location register registering, independently of said satellite generated coverage area movement, additional terminal information for additional terminals located in a said second geographically fixed location area, said second visitor location register located remote from the earth station and at a second equipment site; and     selectively connecting the earth station with one of the first and second visitor location registers depending upon the geographically fixed location within which a current user terminal is located.

18. The subsystem of claim 1, wherein said first earth station is located remotely from said first geographically fixed location area assigned to said MSC/VLR and within said satellite generated coverage area.

19. The subsystem of claim 1 further comprising a home location register (HLR) for registering said terminals, said terminals updating their registration in said HLR and deleting their registration in said first MSC/VLR only when said terminals move into a second geographically fixed location area assigned to a second MSC/VLR.

20. The method of claim 14, wherein said rerouting step consults internal geographic mapping information to determine said earth station capable of establishing said communications link with said user terminal.

21. A subsystem in a satellite based telecommunications system of the type having at least one satellite which supports communications between user terminals and earth stations, said subsystem comprising:

a first earth station for establishing a communications link through a satellite with a user terminal when said user terminal and said earth station are both covered by a satellite generated coverage area that moves with movement of said satellite; and     a first MSC/VLR having a mobile services switching center (MSC) and a visitor locator register (VLR) for registering a terminal therewith by storing terminal information in said first MSC/VLR, said first MSC/VLR registering, in each instance independently of said satellite generated coverage area movement, terminal information for terminals located in a first geographically fixed location area assigned to said MSC/VLR.

\* \* \* \* \*